J. ROBSON.
GAS ENGINE AND VOLATILE FLUID ENGINE PLANT.
APPLICATION FILED DEC. 31, 1907.

913,166.

Patented Feb. 23, 1909.
9 SHEETS—SHEET 1.

Witnesses

Inventor
John Robson
by his Attorney

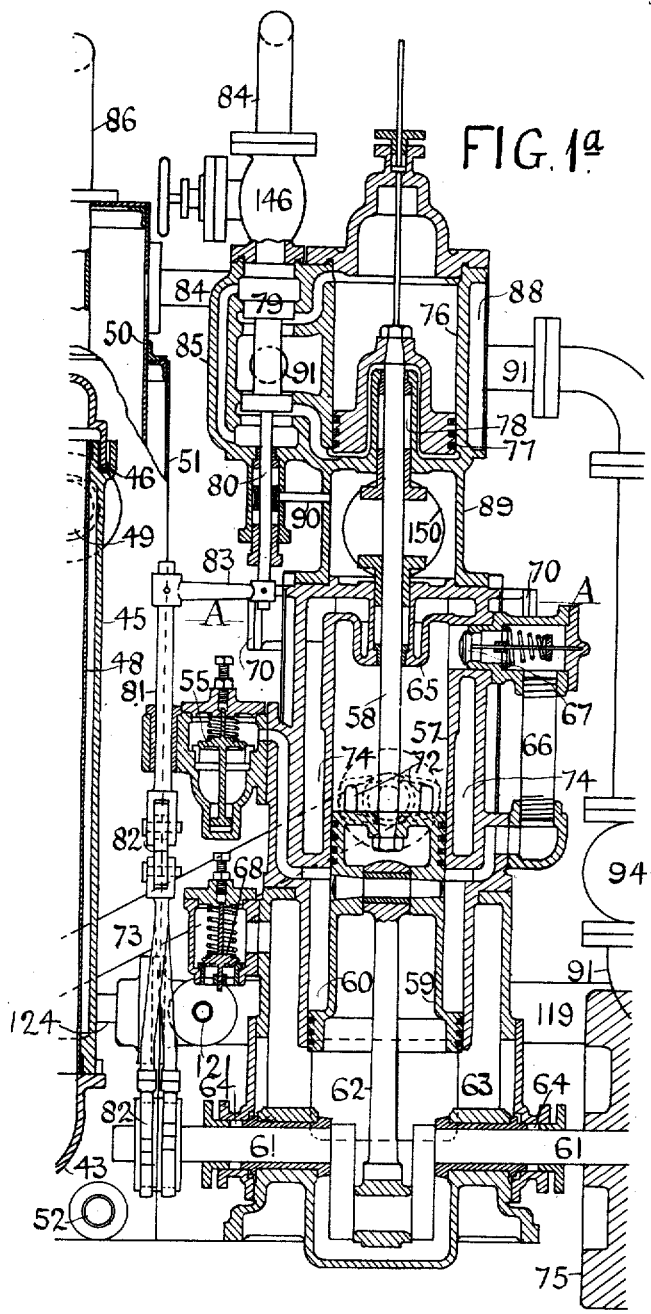

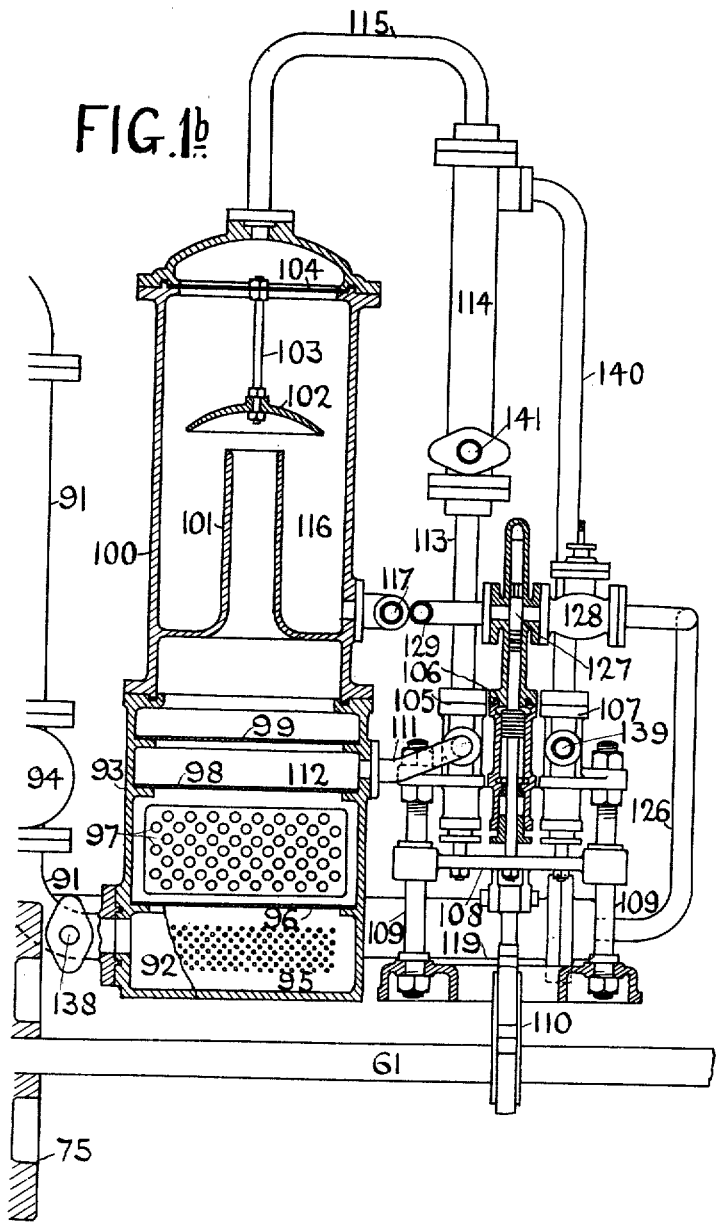

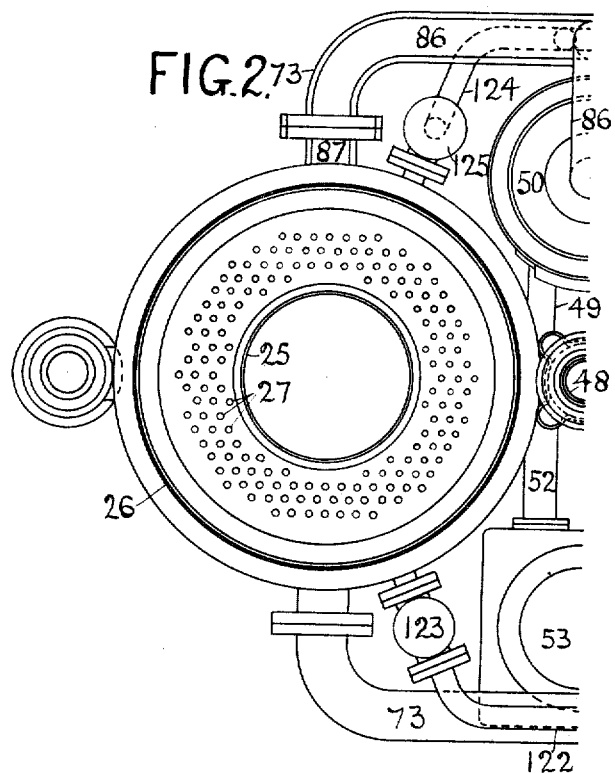

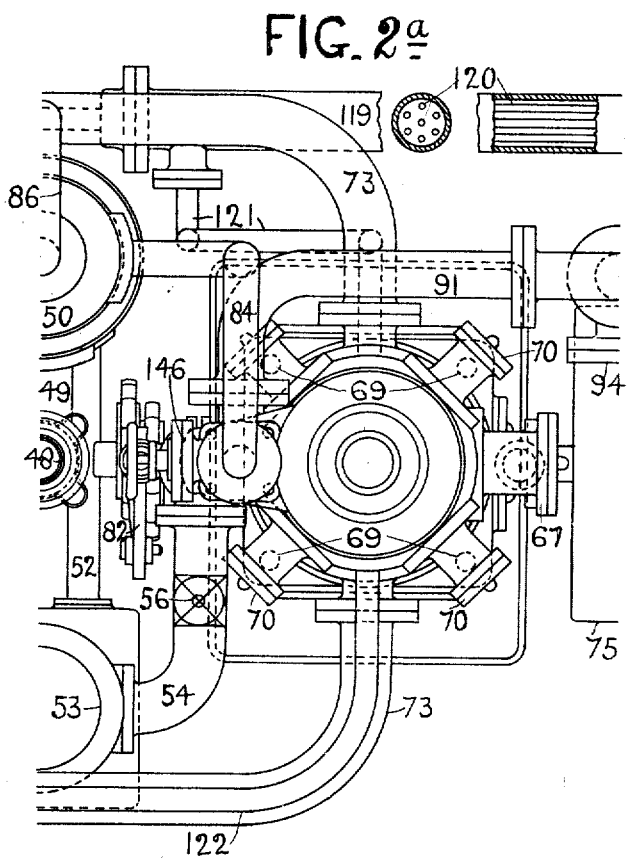

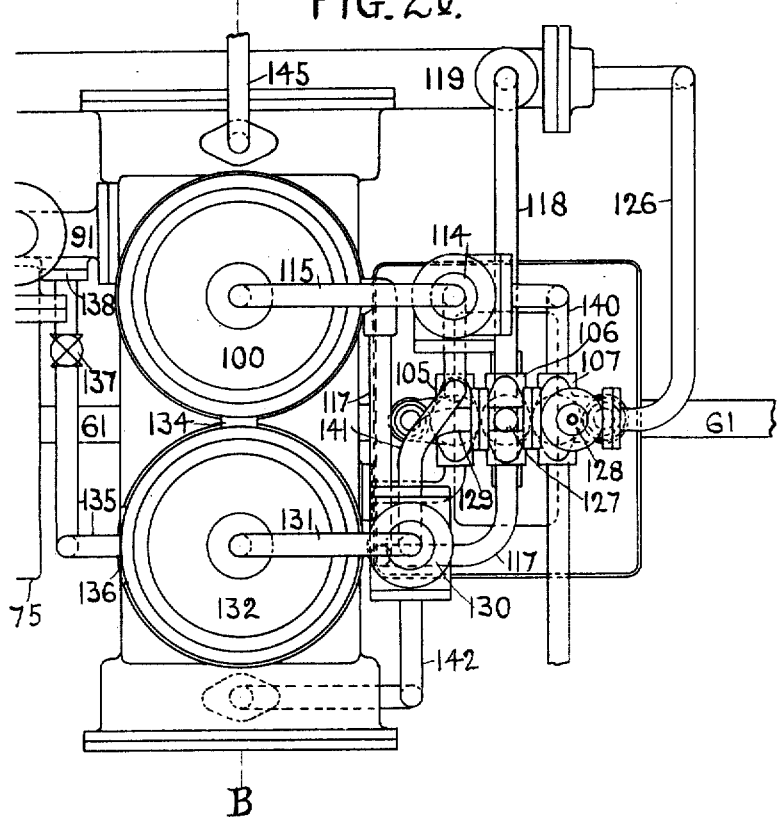

J. ROBSON.
GAS ENGINE AND VOLATILE FLUID ENGINE PLANT.
APPLICATION FILED DEC. 31, 1907.

913,166.

Patented Feb. 23, 1909.

J. ROBSON.
GAS ENGINE AND VOLATILE FLUID ENGINE PLANT.
APPLICATION FILED DEC. 31, 1907.

913,166.

Patented Feb. 23, 1909.
9 SHEETS—SHEET 8.

J. ROBSON.
GAS ENGINE AND VOLATILE FLUID ENGINE PLANT.
APPLICATION FILED DEC. 31, 1907.
913,166.
Patented Feb. 23, 1909.
9 SHEETS—SHEET 9.
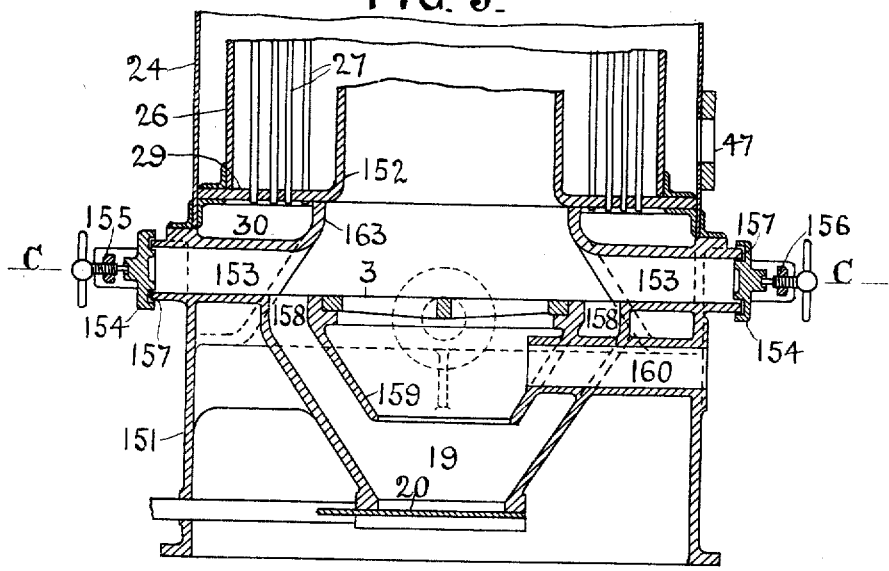
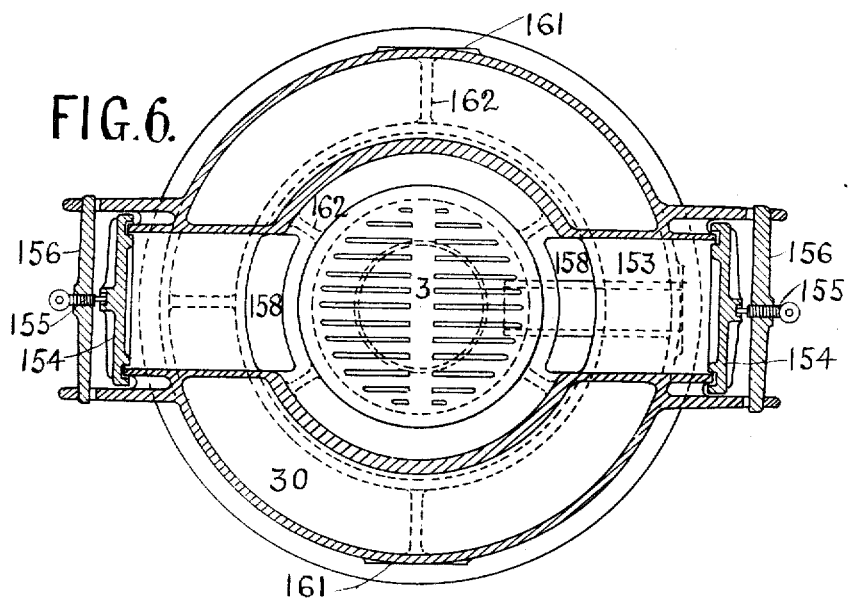

UNITED STATES PATENT OFFICE.

JOHN ROBSON, OF GATESHEAD, ENGLAND, ASSIGNOR TO CLARKE, CHAPMAN & COMPANY, LIMITED, OF GATESHEAD, ENGLAND.

GAS-ENGINE AND VOLATILE-FLUID-ENGINE PLANT.

No. 913,166.    Specification of Letters Patent.    Patented Feb. 23, 1909.

Application filed December 31, 1907. Serial No. 408,839.

*To all whom it may concern:*

Be it known that I, JOHN ROBSON, a subject of the King of England, residing at Gateshead, in the county of Durham, England, engineer, have invented certain new and useful Improvements in Gas-Engine and Volatile-Fluid-Engine Plants, of which the following is a specification.

This invention relates to power generating plant comprising in combination a suction gas producing plant, and a gas engine driven by gas so obtained combined with an engine driven by ammonia, this gas being obtained from water holding it in solution, and the heat necessary to obtain the gas from the solution being supplied by the gas producer and by the gas engine, the two engines working to produce power.

Embodiments of the invention and a modification thereof are shown in the annexed drawings, in which—

Figure 1:
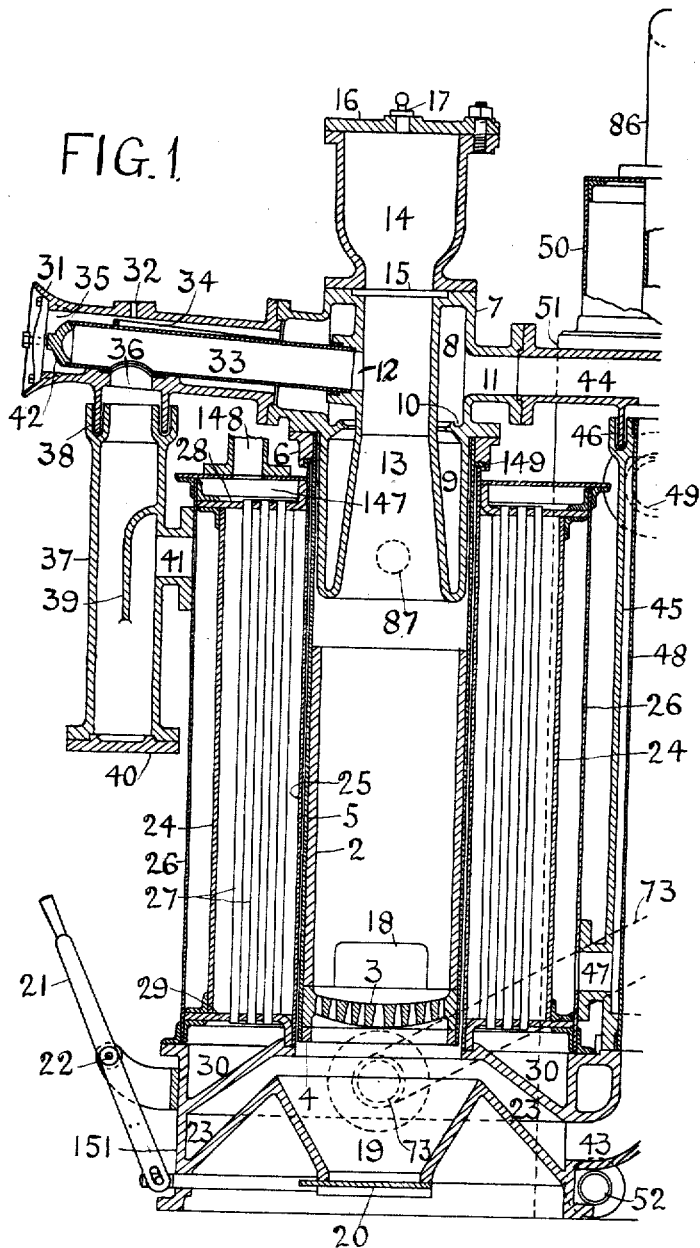
Figure 3:
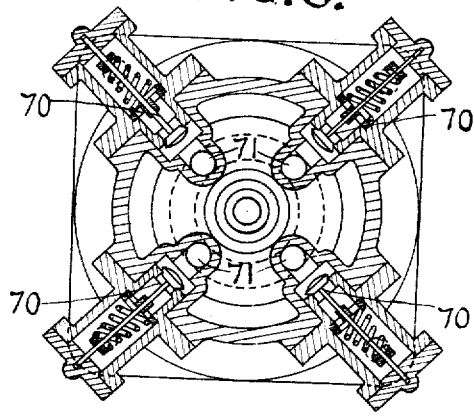
Figure 4:
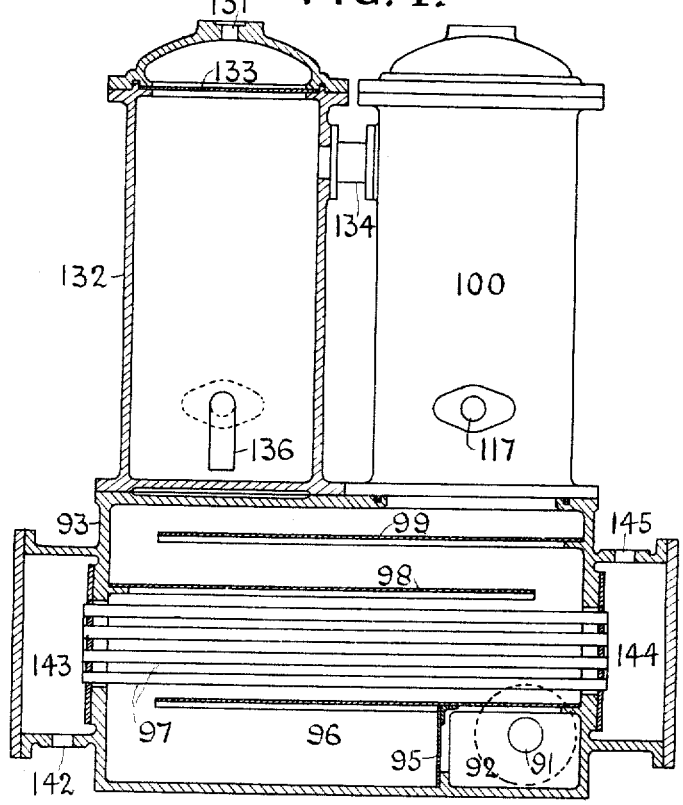

Figures 1, 1ª, 1ᵇ show a sectional elevation of the combination or entire plant. Figs. 2, 2ª, 2ᵇ show a plan thereof. Fig. 3 is a section on line A A of Fig. 1ª, Fig. 4 is a section on line B B of Fig. 2ᵇ. Fig. 5 is a sectional elevation and Fig. 6 a section on line C—C showing a modification of the bottom of the boiler and producer.

In the combined gas producer and ammonia boiler 2 is a protective liner of any suitable material in the gas producer chamber, and it rests on the fire grate 3 which in turn rests on the ring 4 riveted to the shell 5 of the producer.

6 shows a flange riveted to the top of shell 5.

7 is a casting bolted to flange 6 having an upper annular space 8, a lower annular space 9 and a groove 10 in the upper part of the partition between spaces 8 and 9, also a branch pipe 11 from space 8, and a branch pipe 12 from the central space 13.

14 is a coal feeding hopper with slide 15 which can be opened or closed by a suitable lever mechanism.

16 is a cover for hopper 14 with plug hole 17.

18 is an aperture through the liner 2 and shell 5 near the fire grate for extracting clinkers.

19 is a hopper below the grate 3 with a slide 20 actuated by lever 21 pivoted at 22 supported on the bottom casting 151.

23 shows an annular space outside of and open to hopper 19.

24 is the external wall of the boiler.

25 is the internal wall of the boiler.

26 is the outside casing of an annular space round the wall 24.

27 are the tubes. 28 the top tube plate. 29 the bottom tube plate. 30 an annular space between the bottom tube plate 29 and space 23.

31 shows a trumpet shaped pipe. 32 a water pipe connection. 33 an internal pipe from pipe 12 having an external scroll baffle 34 in the annular space 35.

36 is a branch on pipe 33 joining the down pipe 37 by a mercury or other seal joint 38.

39 is a baffle in pipe 37.

40 shows a cover on the end of pipe 37.

41 is a branch on pipe 37 opening into the space between the casing 26 and boiler wall 24.

42 is a cover on the end of pipe 33.

43 is a bend from space 23, or 43 may be a T-branch so that a fan can be fixed to it if necessary.

44 is a pipe joining the pipe 11 to the vertical pipe 45 jointed to the top of branch 43, and having a branch 47 near the bottom opening into the space between casing 26 and wall 24.

46 is a mercury or other seal joint.

48 is a pipe inside pipe 45 between pipe 44 and branch 43.

49 is a pipe from pipe 45 to the annular space around and between the ammonia vapor receiver 50 and the shell 51.

52 shows pipes from the bottom of this space to the washing box 53.

54 is a pipe from the top of box 53 to the automatic valve 55.

56 is a throttle valve in pipe 54.

57 shows the gas engine cylinder. 58 the piston rod. 59 a trunk having two diameters each provided with piston rings, the smaller piston working in cylinder 57 and the larger in chamber 60 below 57.

61 is the crank shaft, 62 connecting rod, 63 crank chamber, 64 stuffing boxes. 65 stuffing box projection in cylinder 57. 66 a pipe from chamber 60 to the automatic valve 67 at the top end of cylinder 57.

68 is an automatic valve in crank chamber 63.

69 shows pipes from chamber 63 to automatic valves 70. 71 passages from valves 70 to cylinder 57.

72 shows the exhaust ports. 73 exhaust pipes connecting with space 30.

74 is a water jacket. 75 the fly wheel on shaft 61.

76 is the cylinder of the ammonia vapor engine. 77 the piston. 78 stuffing box. 79 piston valve. 80 valve rod. 81 slide rod connected to link motion 82; 83 link connecting rod 80 to rod 81.

84 is a pipe between receiver 50 and valve chest 85. 86 a pipe between ammonia vapor receiver 50 and branch 87 near the top of wall 24.

88 is the jacket of cylinder 76.

89 is a chamber between ammonia engine and gas engine. 90 pipe from chamber 89 to lubricate the rod 80. 91 exhaust pipe from cylinder 76 to chamber 92 in absorber 93. 94 non-return valve in pipe 91.

95 is a perforated plate. 96 a baffle plate. 97 tubes. 98 baffle plate. 99 baffle plate. 100 cylindrical chamber on absorber 93. 101 a central pipe. 102 a bell supported by rod 103. 104 a perforated plate or strainer.

105, 106, 107 are pump barrels having pistons connected to cross-head 108 which slides on guide rods 109.

110 is an eccentric connected to crosshead 108.

111 is a suction pipe between barrel 105 and space 112 in the absorber 93.

113 is a pipe between barrel 105 and cooler 114.

115 is a pipe from cooler 114 to top of chamber 100.

116 is a space between central pipe 101 and outside walls of chamber 100.

117 is a suction pipe from space 116 to pump barrel 106.

118 is a delivery pipe from barrel 106 to one end of casing 119 containing tubes 120.

121 is a pipe between the other end of casing 119 and the bottom of water jacket 74.

122 is a pipe from top of jacket 74 to the non-return valve 123 near the top of the boiler.

124 is a pipe connecting the tubes 120 in casing 119 to the bottom of the boiler. 125 is a stop valve. 126 is a pipe from the other end of tubes 120 to the measuring valve 127. 128 is a stop valve on pipe 126.

129 is a pipe from valve 127 to cooler 130.

131 is a pipe from cooler 130 to the top of the cylindrical chamber 132.

133 is a perforated plate.

134 is a pipe joining chamber 100 to chamber 132.

135 is a pipe joining the exhaust 91 at 138 to the bottom of chamber 132.

136 is a bent pipe on the end of pipe 135.

137 is a non-return valve on pipe 135. 139 suction pipe to barrel 107. 140 delivery pipe from barrel 107 to the casing of the cooler 114.

141 is a pipe from the bottom of cooler 114 to top of cooler 130.

142 is a pipe from the bottom of cooler 130 to chamber 143 in the absorber 93. 145 is a discharge from the other chamber 144 in the absorber 93.

146 is a stop valve on pipe 84.

147 shows the top chamber of the boiler.

148 is a pipe to the atmosphere. 149 an asbestos joint. 150 a door for access to chamber 89.

151 is the bottom casting.

In the modification shown in Figs. 5 and 6, there is only one thickness of plate 152 between the producer and boiler space, and this plate is welded to the bottom tube plate 29. 153 shows apertures through the bottom casting 151 to the top of the grate 3, and closed by doors 154 adjusted by the screws 155 through the bars 156. 157 shows a recess in the door. 158 shows apertures. 159 is a shield under the grate. 160 is a pipe to fire grate which would be joined to branch 43. 161 are flanges to which pipes 73 join. 162 are ribs and 163 shows the inside wall of space 30.

The suction gas producer and ammonia boiler are formed in combination, the center chamber being that of the gas producer, and the annular space between 24 and 25, containing the vertical tubes 27, being that of the boiler. Air is sucked in by the trumpet shaped pipe 31 at the top of the producer, entering the annular space 35. At the same time a small quantity of water is dropped through the pipe 32 and spread around the pipe 33 by a scroll baffle 34. The water is vaporized by the hot gases passing through pipe 33, and now becomes mixed with the air passing in at pipe 31, it is afterwards passed round the annulus 8, and should any water not be vaporized by contact with the hot pipe 33, it will pass into the channel 10, which on becoming full will allow any excess to pass down the sides of the vaporizing chamber 9, where, owing to the high temperature of the gases passing from the producer, it will be vaporized and pass out by the pipe 11, and down the pipe 48 to the bottom of the producer, entering the annular space 23 it will pass up through the fire grate 3 into the body of the hot fuel where it is decomposed. The combustible gas now produced passes out by the pipes 12 and 33 into the pipe 37, which is also a dust separator, now passing at 41 into the annular space between 26 and 24 it will part with some of its heat to the solution contained in the boiler, afterwards it is drawn out by suction at the bottom of the annular space by the pipe 47. Passing up the annular spaces between 45 and 48, it will impart heat to the steam and air contained in the pipe 48, which is passing to the fire grate. The combustible gas now passes through the pipe 49 into the annular space, which surrounds the ammonia vapor receiver 50 keeping the ammonia vapor hot, also being cooled by the large surface of the outer shell 51. The gas now being partly cooled leaves the annular chamber by the two pipes 52 (Figs. 2 and 2ª), and enters the hydraulic or washing box 53 which is of similar construction to that described in British specification No. 25560 of 1902.

The washing box 53 may have a coke scrubber and sponge filter fitted on top, and the gas on leaving the sponge filter passes by the pipe 54 to the automatic valve 55 of the internal combustion engine, the cylinder of which is marked 57. This engine in combination with the ammonia engine whose cylinder is marked 76 is of similar construction to that described in British specification No. 10708 of 1906.

Before describing the cycle of the internal combustion engine, a few figures will show the different parts of the gas producer.

14 is the coal feeding hopper, having the slide 15 which can be opened or closed by lever movement.

A suitable cover 16 is fitted to the coal hopper having a plug hole 17. When the slide and plug hole are opened a poker can be passed down into the fire to dislodge any clinker which may have formed. The aperture 18 at the bottom near the fire grate will allow the clinker to be passed out when the center portion of the producer has been raised to a suitable height above the boiler, which can be effected by a suitable worm gear and chain.

It will be seen that the producer and parts connected thereto are removable from the boiler. The shell 5 with the lining 2 and grate 3, and the head consisting of parts 14, 7, 9 and pipes 35 and 44 are all integrally connected and can be lifted away from the boiler.

Seal joints are formed at 38 and 46, which can be sealed with small quantities of mercury, a joint of asbestos packing is also provided at 149.

4 is a wrought iron ring riveted to the internal shell 5 of the producer.

2 is a protecting liner of any suitable material to prevent the excessive heating of the plates.

The ashes passing through the fire grate 3 will collect in the hopper 19, which has a slide 20 provided at the bottom. This slide can be drawn by the lever 21.

The cycle of the internal combustion engine may be thus described. 57 is the cylinder having a through rod 58 with a gland packing at the top, this rod is fitted into the trunk 59, which is connected to the crank shaft 61 by the rod 62. The bottom end of the trunk is of a flanged shape, the flange being fitted with piston rings and working into and forming an annular chamber 60. On the downward stroke of the piston a vacuum is created in this chamber, which lifts the automatic valve 55 and, drawing gas in from the sponge filter by the pipe 54, causes the necessary suction throughout the gas producer, the chamber now being charged with combustible gas from the producer. On the return stroke this gas will be compressed and passed up through the pipe 66 to the automatic valve 67, and delivered into the combustion space at the end of the cylinder 57. When the piston or trunk 59 is at the top of the stroke, air will have been drawn into the crank chamber 63 through the automatic valve 68, which air becomes compressed when the crank is on the bottom center, considerable pressure being raised in the crank chamber 63. This air pressure is passed up through the four pipes 69, opening the automatic valves 70 and in due course passing into the cylinder 57 sweeping out all the burned gases of the previous explosion by the exhaust ports 72 when uncovered by the piston, into the exhaust pipe 73 which communicates with the annular space 30 at the bottom of the gas producer. The cylinder 57 will now contain pure air at about atmospheric pressure, and on the upward stroke of the engine the charge contained in the annulus 60 will be forced into the cylinder striking against the stuffing box projection 65, which will enable it the better to mix with the air, the two charges, that contained in the cylinder 57, and that from the annulus 60 will become mixed, and be fired by any suitable means producing power for the next down stroke of the piston. It may be necessary to admit through the valve 55 into the pump or annular space 60 a small quantity of air to insure the firing of the gas.

74 is the water jacket of the internal combustion engine, which also surrounds the stuffing box 65. When working with ammonia in combination, this water jacket will be filled with ammonia in solution with water. 64 are glands and stuffing boxes to keep the crank casing tight. 75 is a fly wheel to be of suitable proportion for such an engine.

The gas engine is of the two stroke cycle or an impulse for every revolution, it may be necessary in order not to have the valve 67 closed by the explosion, (as these engines fire before turning the dead center on the upstroke) that some arrangements should be made to let free the charge of gas contained in the annulus 60 when about an inch off the end of the stroke. This could be admitted into a small chamber, from which the next charge could be drawn, reducing the pressure in the pipe 66, and thus allowing the valve to close gently and not by the explosion. The hot gases from the exhaust of the internal combustion engine pass into the annulus 30 by the pipe 73, afterwards passing up the tubes 27 contained within the boiler space to the top chamber 147 leaving this chamber by the pipe 148 which may be led to the atmosphere or any suitable outlet. The hot exhaust gases after passing through the tubes and leaving the boiler by the pipe 148 may be still further utilized by passing them through the casing of a similarly constructed heat interchanger as described at 119. If such an arrangement be used the ammonia solution leaving the pipe 121 would be passed through the tubes of this secondary heat interchanger before entering the water jacket of the internal combustion engine, at the same time the exhaust gases from pipe 148 would be passed through the casing of the same interchanger giving up a portion of their heat to the feed ammonia solution before it enters the water jacket. The exhaust gases would leave the casing of this secondary heat interchanger by any suitable outlet to the atmosphere.

If anhydrous ammonia is used for cooling the absorber, it will be necessary to maintain a pressure of about 160 lbs. in the receiver 50, this initial pressure would be rather high for a one cylinder engine, therefore a reducing valve in such a case would be placed on the pipe 84.

As an alternative the gas inlet valve marked 67 at the top of the internal combustion engine cylinder may be operated by an eccentric fixed on the shaft between the stuffing box 64 and the fly wheel 75. This eccentric would be set so that when on its top stroke the crank of the engine would also be on the top stroke, and this would cause the valve to be in the same position when the crank is on the top center, notwithstanding in what direction the engine may be running. The same eccentric rod could be used to admit the anhydrous ammonia into the center and for cooling the piston rod at every top stroke of the ammonia engine piston. The valve 67 will then be mechanically operated instead of being an automatic valve.

Having thus described the internal combustion engine, it is now necessary to explain the ammonia engine.

The cylinder 76 is arranged to work in tandem with the gas engine cylinder 57 the piston rod 58 passing through the stuffing boxes 65 and 78. This engine may be actuated with a piston valve, as shown at 79, or any suitable valve gear may be used. The piston rod 58 can be cooled by the injection of ammonia as described in the specification of my prior patent No. 883,487, dated 31 March, 1908.

As shown the valve gear used is of the well known link motion type, the links can be worked by a weigh-bar passing along the back of the engine having a lever with suitable notch plate for linking up and changing the cut off when necessary. The same weigh-bar and lever also actuates the valve 56 in the gas pipe 54 which is attached to the washing box 53. This valve may be of a tapered plug cock type or any suitable throttle arrangement.

Assuming that the engine be run at full power and the cut-off in the ammonia cylinder be at half stroke, to slow down it would be necessary first to gradually cut the gas engine out of action, the first notch in the plate would probably reduce the explosive charge to about three quarters of the full power charge, the next would be to half, and then to quarter, lessening the amount of combustible gas drawn in to the annulus 60, which charges the cylinder 57.

When very little power or slow speed may be required the gas engine should be first cut out of action, after which the cut-off of the ammonia cylinder would be reduced say from half to quarter or whatever may be required. The same lever which works in connection with the notch plate and actuates the link motion and also the gas supply to the gas engine, can be arranged to actuate the supply water which enters the top of the producer at 32. This is the water which is vaporized and mixed with the air. When a smaller charge of gas is required in the cylinder 57, the water is slightly cut off, and when the gas engine is thrown out of action it is entirely cut off, but a small by-pass suction still takes place through the annulus 60, drawing a little pure air through the producer, and maintaining the fire in a suitable condition to respond to any immediate demand for gas.

The ammonia vapor is supplied to the cylinder 76 which communicates with the ammonia vapor receiver 50 by the pipe 84. This receiver is also a separator, being supplied through the pipe 86 with ammonia vapor which may contain a small percentage of water. This pipe communicates with the ammonia boiler space at 87. The space between 24 and 25 of the ammonia boiler is filled with ammonia in solution with water, and it is necessary to take a pipe out as near the top as possible to communicate with the ammonia vapor receiver 50. Another separator may be provided nearer to the boiler to take the water carried over with the vapor in the initial stage. The pipe 86 will pass to about a foot off the bottom of the receiver 50, and any water or ammonia in solution with water deposited there can be drawn off by an arrangement of suitable pipes and used again in the absorber.

The combined engines, as described, are reversible, the gas engine valves being so arranged that the engine will run in whatever direction the crank may be placed, and the ammonia engine being connected by the link motion will therefore control the gas engine, such an arrangement will be necessary for driving any vessels or wherever reversing engines are required.

For running steady in one direction, a governor may be placed on top of the valve chamber 85. This governor can also be arranged to actuate the supply of gas to the gas engine, it can also control the supply of water to the producer at 32.

The jacket or casing can be arranged around the ammonia cylinder 76, as at 88, into which a small portion of the exhaust gases from the engine cylinder 57 can be passed to maintain the necessary heat in the ammonia cylinder, or other means may be used such as the hot gases escaping from the producer before passing to be cooled.

The space 89 between the ammonia cylinder and the gas engine cylinder can be filled with oil, and maintained at a small pressure to prevent any leakage passing from the glands. A communication with the slide rod stuffing box can also be made by the pipe 90 to lubricate the slide rod 80.

The exhaust ammonia gas passes from the ammonia cylinder by the pipe 91; descending to the non-return valve 94 it enters into the perforated chamber 92 of the absorber 93, and passing through the perforation in 95, the gas travels to the end of the baffle plate 96 then passes up among the tubes 97 to the end of the baffle plate 98, then to the end of the baffle plate 99 in the same manner as described in the specification of my pending application Serial No. 344,087, filed 19 November 1906. Any gas now remaining unabsorbed would pass up the center pipe 101 into the cylindrical chamber 100. Near the top of this chamber is a perforated plate or strainer 104.

The suction port of barrel 105 is connected by the pipe 111 to the space 112 of the absorber. The solution contained in this space is fairly strong having absorbed a good deal of the gas passing through it, it is now drawn into the pump barrel and delivered by the pipe 113 into the cooler 114, and passing through the tubes is delivered by the pipe 115 on to the perforated plate 104. The liquid comes down in a shower or spray falling on to the bell 102 which guides it into the annular receiver 116, this solution having been cooled by some suitable refrigerating agent, such as anhydrous ammonia will absorb all the vapor which would pass from the bottom of the absorber, therefore the solution in the annular receiver 116 must be the strongest, and the feed pump suction pipe 117 of pump barrel 106 is connected to this receiver.

The delivery pipe 118 of the feed pump 106 is connected to the casing 119 which has a number of small tubes 120. These tubes are connected to the boiler by the pipe 124 and valve 125 so that the hot weak solution coming from the bottom of the boiler passes through the tubes exchanging its heat with the feed ammonia which is being forced through the casing 119. The pipe 126 delivers the weak solution which has been partly cooled to the measuring valve 127, which is similar to that described in the pending application Serial No. 344,087 aforesaid. This solution after passing through the measuring valve enters by pipe 129 another cooler 130, and is forced into the top of another cylindrical chamber 132 falling on the perforated plate 133 therein whence it descends to near the bottom of the chamber. The two cylindrical chambers 100 and 132 are connected together by the pipe 134, so that any gas not absorbed in 100 will become absorbed in 132. At the bottom of the cylinder 132 a small depth of weak ammonia solution will remain, and a bend 136 dips into this solution to form a seal for the gas, and at the same time to allow the liquid when rising to a level above the bend, to be drained off into the exhaust pipe by the pipe 135. 137 is a non-return valve on pipe 135, the said pipe entering the exhaust bend 91 at 138. This cooled and weak solution passes into the bottom of the absorber to be re-charged with ammonia gas. The strong ammonia solution which is being fed into 119 by the pipe 118 after receiving some heat from the weak solution, which has passed through the tubes, is next passed out of the casing 119 by the pipe 121 into the bottom of the jacket 74 of the internal combustion engine, and having received heat from the cylinder passes out by the pipe 122 at the opposite side and top of the jacket to the non-return valve 123 near the top of the boiler, thus completing the feed of the strong ammonia solution to the boiler, having taken up heat from the heat exchanger and jacket of the gas engine.

The three pump barrels 105, 106 and 107 are driven by the eccentric 110, which is fixed on the main shaft 61 of the engine, or they may be driven by a separate cylinder which can be worked by the ammonia evaporated in the coolers 114 and 130 in a similar manner, as described in the specification of the pending application Serial No. 344,087 before referred to. The three pumps are fitted with the usual mushroom valves. Barrel 105 as described is for removing the moderately strong ammonia from chamber 112 and passing it down in sprays in the cylinder 100. The center barrel 106 which also has the measuring valve 127 on top of it, is the feed pump which draws the strong solution from the annulus 116 and forces it into the casing 119 and as previously described, into the gas engine jacket, and then into the boiler. The barrel 107 may draw water by the suction pipe 139 from any convenient source, and deliver it by the delivery pipe 140 into the casing of the cooler 114, then by the pipe 141 into the top of the cooler 130. From the bottom of this cooler the water is next passed by the pipe 142 into the bottom of the water supply chamber 143, then through the cooling tubes 97 of the absorber, then into the chamber 144, leaving the absorber at the top of the chamber by the pipe 145.

Suitable baffle plates can be arranged in the chambers 143 and 144 to pass the water through the tubes in one continuous stream, as is usually done in steam condensers.

As previously stated the coolers 114 and 130 can be supplied with anhydrous ammonia, which would be liquefied in a similar manner to that described in the specification of the aforesaid pending application Serial No. 344,087. With such an arrangement the pump barrel 107 would pass the cooling water through the liquefier, and then through the absorber tubes in the same manner as above described.

In the modification shown in Fig. 5, which is a sectional elevation showing the cast iron producer bottom, also a portion of the boiler and internal fire tube, and in Fig. 6 which is a plan in section through C C 26 is an external shell. Between 26 and 24 is an annulus containing the combustible gas. Between 24 and 152 is the boiler space and 27 shows the tubes through which the exhaust from the gas engine is passed. 152 is the internal tube which contains the gas producer fire. 47 is the outlet from the annulus between 26 and 24 where the suction of the gas engine takes place. 153 are two apertures passing through the cast iron base 151 to enable any clinker which may be formed in the producer or upon the grate 3 to be removed. 154 are doors suitably adjusted by bar 156 and screw 155. Plug holes are provided in the doors 154 to enable a short bar to be passed through and any clinker formed on the grate will be dropped through the apertures 158, then falling into the hopper 19 the same can be delivered into the ashpit by moving the slide 20 which is actuated by a lever 21 as previously explained. 159 is a shield to admit the air direct to the firegrate through the pipe 160 which is connected with the top of the producer where the water is vaporized and mixed with the air as previously described. The doors 154 can be kept tight by a suitable bed of asbestos in the recess 157. The apertures 153 are large enough to enable the fitting of firebars to the grate 3. 161 are flanges to which the exhaust pipes from the gas engine are connected, the exhaust passing into the annular space 30 and up through the tubes 27. 162 are ribs to strengthen the casting 151. When first lighting up the producer a small fan can be connected to the pipe 160 and blown by hand or by any suitable means, this is only necessary for starting as the draft would afterwards be created by the engine suction. In this modified producer the fire will come direct against the internal surface of the center tube in the boiler, marked 152, this tube as shown is welded to the tube plate 29. If excessive heating should occur at the bottom of the producer at 163 suitable baffles can be arranged to protect the cast iron. A suitable outlet pipe can be arranged connecting with the space between 26 and 24 or any other suitable part of the producer, for use when the plant is not working. This pipe would have a throttle valve fitted within it. To admit the air to the bottom of the producer some suitable valve would also be arranged at 160. By opening such valves air will be admitted at the bottom of the producer fire and passing up through the fuel would communicate with the outlet pipe from the space between 26 and 24 to the atmosphere. This is only to supply air to the fire when the plant is laid off for a little while.

A considerable amount of heat will be developed throughout the plant, and it will be possible to effect a great saving also if the boiler is filled with water and steam raised; or with a volatile liquid whence vapor is developed. While, therefore, I have described the plant with reference to the use of ammonia, I desire it to be understood that in place of ammonia, or ammonia solution I may use any volatile liquid.

What I claim as my invention and desire to secure by Letters Patent of the United States is:—

1. In a power generating plant the combination of a gas producer a volatile fluid generator inclosing said producer, an internal combustion engine, a volatile fluid engine working in synchronism therewith, means for passing gas from the producer to the internal combustion engine, means for feeding volatile fluid from the generator to the volatile fluid engine, an absorber, means for passing exhaust fluid from the volatile fluid engine to the absorber, means for passing strong volatile solution from said absorber to the generator and means for passing weak volatile solution from the generator to the absorber.

2. In a power generating plant the combination of a volatile fluid generator, a gas producer located within said generator, an internal combustion engine, a volatile fluid engine working in synchronism therewith, means for passing gas from the producer around the generator to the cylinder of the internal combustion engine, means for heating the generator by the exhaust gases from the internal combustion engine, a volatile fluid receiver, means for supply of volatile fluid to said receiver from the generator, means for feeding volatile fluid from said receiver to the cylinder of the volatile fluid engine, an absorber, means for passing exhaust fluid from the cylinder of the volatile fluid engine to the absorber, a cooler, means for passing strong volatile solution from said absorber through the cooler to the generator and means for passing weak volatile solution from the generator to the absorber.

3. In a generating plant the combination of a volatile fluid generator, a gas producer located within said generator, an internal combustion engine, a volatile fluid engine working in synchronism with said internal combustion engine, means whereby the starting, reversing and governing of both engines is controlled by the volatile fluid engine, means for passing gas from the producer around the generator to the internal combustion engine, means for heating the generator by the exhaust gases from the internal combustion engine, a volatile fluid receiver, means for supply of volatile fluid from the generator to said receiver, means for heating the contents of said receiver by gas from the producer, means for feeding volatile fluid from said receiver to the volatile fluid engine, an absorber, means for passing exhaust fluid from the volatile fluid engine to the absorber, coolers, means for passing strong volatile solution from the absorber through a cooler to the generator, means for passing weak volatile solution from the generator through a second cooler to the absorber, and a heat interchanger interposed between generator and absorber in the path of the aforesaid strong and weak solutions.

4. In a power generating plant the combination of a volatile fluid generator, a gas producer located within said generator, an internal combustion engine, a volatile fluid engine working in synchronism with said internal combustion engine, means whereby the starting, reversing and governing of both engines is controlled by the volatile fluid engine, means for passing gas from the producer around the generator to the internal combustion engine, a washing box interposed between the producer and internal combustion engine in the path of the gas to the latter, means for heating the generator by the exhaust gases from the internal combustion engine, means for supply of volatile fluid from the generator to the volatile fluid engine, a volatile fluid receiver between the generator and said latter engine, in the path of the fluid thereto, means for heating the contents of said receiver by gas from the producer, intercommunicating absorbers in communication with the exhaust of the volatile fluid engine, coolers, a measuring valve, a heat interchanger interposed between the generator and absorbers, means for passing strong volatile solution from an absorber through a cooler, and the heat interchanger, around the cylinder of the internal combustion engine to the generator, and means for passing weak solution from the generator through the heat interchanger, the measuring valve and a cooler to the absorber.

5. In a power generating plant the combination of a volatile fluid generator comprising a casing, a series of tubes within said casing, a jacket surrounding the latter and means for imparting heat to said tubes, a gas producer within said generator and comprising a combustion chamber, means for feeding fuel thereto, vaporizing elements having inlets for air and water, means for heating said vaporizing elements by gas from the combustion chamber, and means for passing gas from the producer into the jacket of the volatile fluid generator.

6. In a power generating plant the combination of a volatile fluid generator, comprising a casing for containing volatile fluid in solution, a series of tubes traversing said casing adapted to be traversed by heating gases, a gas producer within said generator and removable thereon said producer comprising a combustion chamber, a grate, closable means for feeding fuel thereto, vaporizing elements having inlets for air and water, means for heating said vaporizing elements by gas from the combustion chamber, a conduit for conveying vapor from the vaporizing elements to a point below the grate, means for passing gas from the producer into the jacket of the volatile fluid generator, and means for passing gas from said jacket around the vapor conveying conduit aforesaid.

7. In a power generating plant the combination of a volatile fluid generator comprising a casing for containing volatile fluid in solution, a series of tubes traversing said casing, a gas producer within said generator, and comprising a combustion chamber, a grate, means for feeding fuel thereto, vaporizing elements having inlets for air and water and means for heating said vaporizing elements by gas from the combustion chamber, means for conveying vapor from the vaporizing elements to a point below the producer grate, an internal combustion engine comprising a cylinder with gas inlet and exhaust valves and a piston in said cylinder, a volatile fluid engine comprising a cylinder with fluid inlet and exhaust valves and a piston in said cylinder, a piston rod common to the pistons of both said cylinders, means controlled by the volatile fluid engine for starting, reversing and governing both said engines, means for supply of volatile fluid from the generator to the volatile fluid engine, means for supply of gas from the gas producer to the internal combustion engine and means for supply of exhaust gases from the latter engine to the aforesaid tubes of the generator.

In witness whereof I have signed this specification in the presence of two witnesses.

JOHN ROBSON.

Witnesses:
    THOMAS W. THOMPSON,
    ARTHUR E. WRAY.